United States Patent
Sano et al.

(10) Patent No.: US 10,259,538 B2
(45) Date of Patent: Apr. 16, 2019

(54) LIQUEFIED GAS TANK AND ON-WATER STRUCTURE INCLUDING THE SAME

(71) Applicant: KAWASAKI JUKOGYO KABUSHIKI KAISHA, Kobe-shi, Hyogo (JP)

(72) Inventors: Atsushi Sano, Kakogawa (JP); Naruyoshi Izumi, Kobe (JP); Yukichi Takaoka, Kobe (JP); Toshifumi Fukasawa, Nishinomiya (JP); Hiroyasu Nishikawa, Kobe (JP); Hideki Kumamoto, Akashi (JP); Hiroaki Mori, Kobe (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 165 days.

(21) Appl. No.: 15/035,268

(22) PCT Filed: Nov. 5, 2014

(86) PCT No.: PCT/JP2014/005562
§ 371 (c)(1),
(2) Date: May 9, 2016

(87) PCT Pub. No.: WO2015/068383
PCT Pub. Date: May 14, 2015

(65) Prior Publication Data
US 2016/0280335 A1    Sep. 29, 2016

(30) Foreign Application Priority Data
Nov. 7, 2013   (JP) ................................. 2013-230949

(51) Int. Cl.
*F17C 1/02* (2006.01)
*B63B 25/16* (2006.01)
(Continued)

(52) U.S. Cl.
CPC ................ *B63B 25/16* (2013.01); *B63B 3/56* (2013.01); *B63B 25/12* (2013.01); *F17C 3/00* (2013.01);
(Continued)

(58) Field of Classification Search
CPC ....... B63B 25/16; B63B 3/56; B63B 2025/87; F17C 3/00; F17C 2205/013;
(Continued)

(56) References Cited

U.S. PATENT DOCUMENTS 3,583,351 A   6/1971 Gorman
3,904,067 A   9/1975 Kuniyasu et al.
(Continued)

FOREIGN PATENT DOCUMENTS

JP   H07-139699 A   5/1995
JP   2007-527490 A   9/2007
(Continued)

OTHER PUBLICATIONS

May 29, 2017 Extended Search Report issued in European Patent Application No. EP 14860212.1.
(Continued)

*Primary Examiner* — Stephen J Castellano
(74) *Attorney, Agent, or Firm* — Oliff PLC

(57) ABSTRACT

A liquefied gas tank installed in a surrounding structural body includes: a tank main body in which a liquefied gas is storable, the tank main body including a plurality of planar portions and corner portions between the planar portions, the corner portions having less rigidity than that of the planar portions; a bottom supporting body that supports the tank main body from below the tank main body; and a plurality of side supporting bodies that support the tank main body from side of the tank main body. The tank main body is configured to stand by itself by being supported by the
(Continued)

bottom supporting body when the tank main body stores no cargo, and be supported by the bottom supporting body and the side supporting bodies when the liquefied gas is stored in the tank main body.

15 Claims, 10 Drawing Sheets

(51) Int. Cl.
    *B63B 3/56*     (2006.01)
    *F17C 3/00*     (2006.01)
    *B63B 25/12*     (2006.01)

(52) U.S. Cl.
    CPC    *F17C 2201/0157* (2013.01); *F17C 2201/052* (2013.01); *F17C 2203/012* (2013.01); *F17C 2203/03* (2013.01); *F17C 2203/0648* (2013.01); *F17C 2203/0663* (2013.01); *F17C 2205/013* (2013.01); *F17C 2205/0192* (2013.01); *F17C 2221/012* (2013.01); *F17C 2221/033* (2013.01); *F17C 2221/035* (2013.01); *F17C 2223/0161* (2013.01); *F17C 2227/04* (2013.01); *F17C 2270/0105* (2013.01); *Y02E 60/321* (2013.01)

(58) Field of Classification Search
    CPC ...... F17C 2205/0192; F17C 2201/0157; F17C 2270/0105
    USPC ........................................................ 220/565
    See application file for complete search history.

(56) References Cited

U.S. PATENT DOCUMENTS

| | | | |
|---|---|---|---|
| 6,398,057 B1 * | 6/2002 | Berg | ............... B65D 90/028 |
| | | | 220/565 |
| 2003/0057214 A1 | 3/2003 | Miller et al. | |
| 2008/0223858 A1 | 9/2008 | Jordan et al. | |
| 2008/0314908 A1 | 12/2008 | Bakken et al. | |
| 2010/0258571 A1 | 10/2010 | Ramoo et al. | |
| 2011/0315691 A1 | 12/2011 | Skovholt | |
| 2014/0131360 A1 | 5/2014 | Aoki | |
| 2014/0137782 A1 | 5/2014 | Cho et al. | |

FOREIGN PATENT DOCUMENTS

| | | |
|---|---|---|
| JP | 2009-018608 A | 1/2009 |
| JP | 2010-521379 A | 6/2010 |
| JP | 2012-515316 A | 7/2012 |
| JP | 2013-116669 A | 6/2013 |
| WO | 2012161493 A2 | 11/2012 |
| WO | 2012/176757 A1 | 12/2012 |

OTHER PUBLICATIONS

Feb. 17, 2015 Search Report issued in International Patent Application No. PCT/JP2014/005562.
Feb. 17, 2015 Written Opinion issued in International Patent Application No. PCT/JP2014/005562.
May 10, 2016 International Preliminary Report on Patentability issued in International Patent Application No. PCT/JP2014/005562.
Nov. 30, 2016 Office Action issued in Chinese Patent Application No. 201480059469.0.

* cited by examiner

LIQUEFIED GAS TANK AND ON-WATER STRUCTURE INCLUDING THE SAME

This application is the national stage (Rule 371) of international application No. PCT/JP2014/005562 filed Nov. 5, 2014.

TECHNICAL FIELD

The present invention relates to a liquefied gas tank for storing a liquefied gas and an on-water structure including the liquefied gas tank.

BACKGROUND ART

Conventionally, spherical tanks, independent prismatic tanks, membrane tanks, horizontal type cylindrical tanks, etc., are known as tanks to be installed on a ship that transports a liquefied gas. Examples of the liquefied gas stored in such a tank include liquefied petroleum gas (LPG: about −41° C.), liquefied ethylene gas (LEG: about −104° C.), liquefied natural gas (LNG: about −163° C.), and liquefied hydrogen ($LH_2$: about −253° C.).

In recent years, for example, development of a LNG terminal that liquefies, on the ocean, natural gas excavated from an offshore gas field or the like and stores it on the ocean as liquefied natural gas (LNG) has been conducted. One example of such a LNG terminal is one with a ship hull shape and a fixed-point retention function. Such a LNG terminal includes equipment for lifting the natural gas from the seafloor, a liquefier for liquefying the natural gas into LNG, a power generating unit, a transfer apparatus, etc., which are disposed on the upper part of the hull. The hull includes storage equipment therein. Desirably, the storage equipment is a liquefied gas tank that allows the deck of the hull to have a flat plane so that the aforementioned equipment and apparatuses can be readily disposed on the deck of the hull, and allows a great amount of liquefied gas to be stored inside the hull.

In one example of prior art relating to a support structure of this kind of liquefied gas tank, a plurality of first members fixed to a surrounding structural body surrounding a prismatic semi-membrane tank are slidably engaged with a plurality of second members fixed to four side walls and a top wall of the tank (see Patent Literature 1, for example). One first member and one second member engaged therewith form a support assembly, and the support assembly includes an inclined surface that slopes downward toward the center of the tank. The inclined surface is a contact surface between the first member and the second member, and the first member and the second member are engaged with each other such that they can move relative to each other only along the inclined surface. That is, in this support structure, the second member is prevented from being spaced apart from the first member in both parallel and perpendicular directions to the side walls or the top wall of the tank.

In another example of prior art relating to a tank support structure, a plurality of coupling members connect between each side wall of a prismatic semi-membrane tank and a surrounding structural body (see Patent Literature 2, for example). Each coupling member extends horizontally, and one end of the coupling member is coupled to a side wall of the tank by a ball joint, and the other end of the coupling member is coupled to the surrounding structural body by a ball joint. With the coupling members, the support structure allows the side walls of the tank to make in-plane movement relative to the surrounding structural body.

CITATION LIST

Patent Literature

PTL 1: Japanese National Phase PCT Laid-Open Publication No. 2007-527490

PTL 2: Japanese National Phase PCT Laid-Open Publication No. 2010-521379

SUMMARY OF INVENTION

Technical Problem

However, in the case of the tank support structure described in Patent Literature 1, each of the support assemblies disposed on the side walls of the tank needs to include the inclined surface that takes account of the influence of thermal contraction of the tank. Moreover, the inclined surfaces of the support assemblies vary at their respective positions, and it is highly difficult to manufacture the tank support structure while controlling the precision of the inclined surfaces. In addition, since support positions on the surrounding structural body are limited, it is necessary to manufacture the surrounding structural body in accordance with supported positions of the tank. Furthermore, in the tank support structure described in Patent Literature 1, the angle at which the first member and the second member of each support assembly contact each other (i.e., the angle of the inclined surface) varies for each support assembly. In the case of such a support structure, the first members and the second members of all the support assemblies cannot be engaged together at the same time when the tank is installed, and it is necessary to individually fix each support assembly to the tank and the surrounding structural body in a state where the first member and the second member are engaged together. Accordingly, for example, the following work needs to be performed: before the tank is installed, the first members and the second members are engaged together; then the second members are fixed to the tank (here, the first members are temporarily fixed to the second members); and after the tank is installed, the first members are fixed to the surrounding structural body. Thus, in the case of the tank support structure described in Patent Literature 1, after the tank is installed, it is necessary to perform the work of fixing the first members and/or the second members in a narrow space between the tank and the surrounding structural body. As a result, the work becomes onerous, and requires a large amount of work time and great labor and cost.

In the case of the tank support structure described in Patent Literature 2, lattice-like reinforcing members are provided on the side walls of the tank, and a significantly large number of coupling members are provided between the reinforcing members and the structure so that a load exerted on the tank will be supported by the surrounding structural body. Therefore, a large amount of manufacturing time and great cost are required for fixing these coupling members. In particular, in order to increase the tank capacity, more coupling members are necessary, and a larger amount of manufacturing time and greater cost are required. Moreover, since the tank cannot stand by itself independently, when or after the tank is set, it is necessary to perform the work of coupling the lattice-like reinforcing members of the entire side walls of the tank to the surrounding structural body in a narrow space. Also in this respect, a large amount of work time and great labor and cost are required.

In view of the above, an object of the present invention is to provide a liquefied gas tank that can be readily manufactured and installed and that is capable of, for example, stably storing and discharging a liquefied gas, and to provide an on-water structure including the liquefied gas tank.

Solution to Problem

In order to achieve the above object, a liquefied gas tank according to the present invention, which is a liquefied gas tank installed in a surrounding structural body, includes: a tank main body in which a liquefied gas is storable, the tank main body including a plurality of planar portions and corner portions between the planar portions, the corner portions having less rigidity than that of the planar portions; a bottom supporting body that supports the tank main body from below the tank main body; and a plurality of side supporting bodies that support the tank main body from side of the tank main body. The tank main body is configured to stand by itself by being supported by the bottom supporting body when the tank main body stores no cargo, and be supported by the bottom supporting body and the side supporting bodies when the liquefied gas is stored in the tank main body.

According to the above configuration, the tank main body can stand by itself separately from the surrounding structural body, and the tank main body can be manufactured independently. In addition, the tank main body with the side supporting bodies and the bottom supporting body fixed thereto can be installed, as an independent structure, in the installation-side surrounding structural body, and can be manufactured in parallel with the manufacturing of the surrounding structural body (e.g., a hull). This makes it possible to manufacture an on-water structure and the liquefied gas tank efficiently, and readily install them.

In a state where the liquefied gas tank is installed in the surrounding structural body, the tank main body is supported by the bottom supporting body when the tank main body stores no cargo. Accordingly, the tank main body can stand by itself independently when storing no cargo. When the liquefied gas is stored in the tank main body, the bottom supporting body and the side supporting bodies can support the tank main body.

Advantageous Effects of Invention

The present invention makes it possible to provide a liquefied gas tank that is capable of for example, storing and discharging a liquefied gas stably, realizes a reduction in its manufacturing cost, and is readily installable.

DESCRIPTION OF EMBODIMENTS

Hereinafter, one embodiment of the present invention is described with reference to the drawings. In the embodiment below, a description is given by taking an example in which a top planar portion of a liquefied gas tank has a cambered dome-shaped structure. The description below takes a ship as one example of an on-water structure including the liquefied gas tank. In this example, the hull of the ship serves as a surrounding structural body in which the liquefied gas tank is to be installed. The on-water structure is not limited to a ship, but may be an offshore platform connected to the seafloor, a floating structure floating on the ocean, a marine structure, or the like. It should be noted that the term "liquefied gas tank" used to specify the present invention is a concept including supporting bodies. In the description and claims herein, the term "planar portion" refers to each of the six planes of the main body of the tank, excluding its corner portions.

Figure 1:
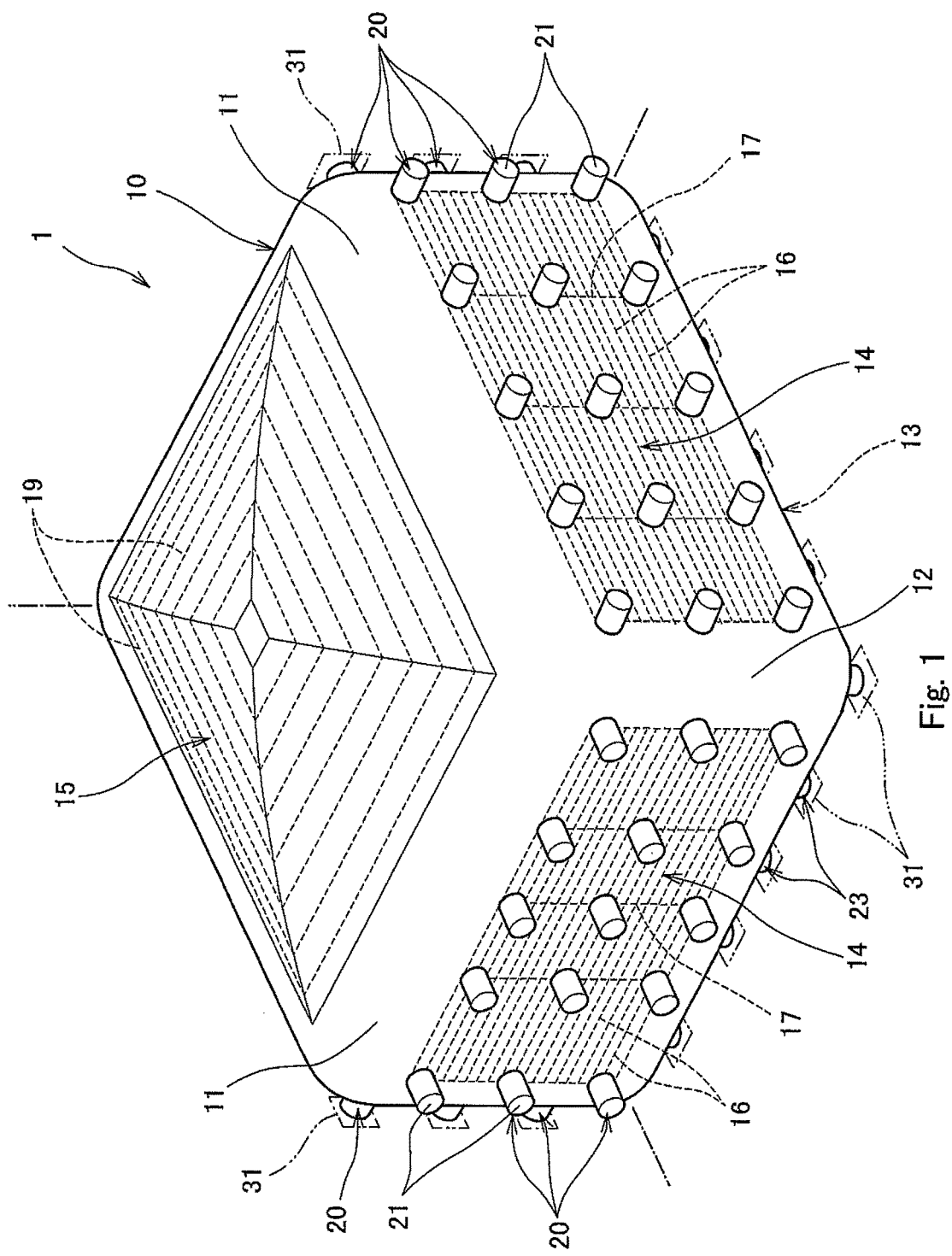
FIG. 1 is a perspective view of a liquefied gas tank according to one embodiment of the present invention when seen from above.
Figure 2:
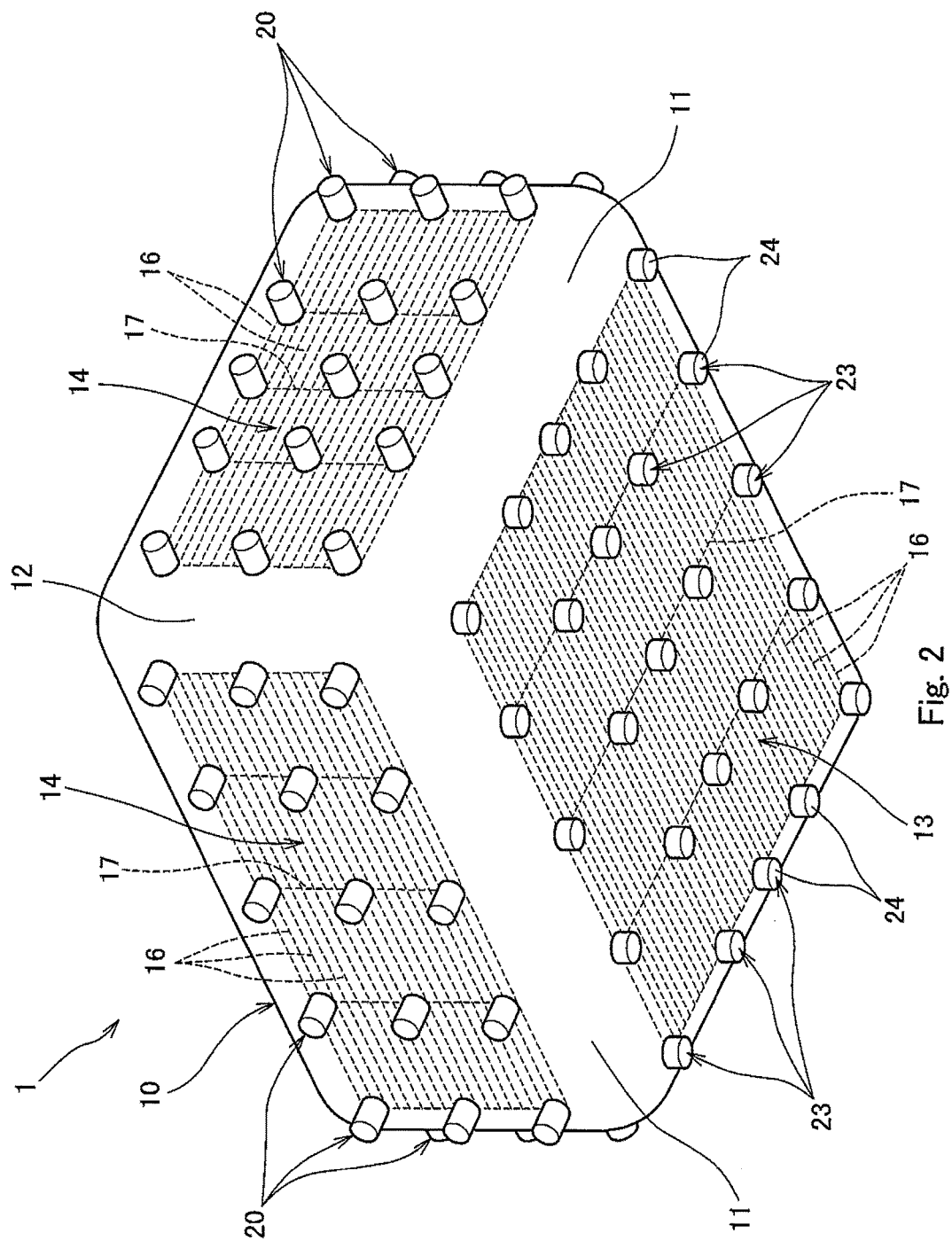
FIG. 2 is a perspective view of a tank main body of the liquefied gas tank of FIG. 1 when seen from below.

As shown in FIGS. 1 and 2, a liquefied gas tank 1 according to the present embodiment includes a tank main body 10, which is formed to have a quadrangular shape (the shape may be either a square-like shape or a rectangle-like shape) whose corners are rounded when seen in plan view. Of the tank main body 10, horizontally-extending eight corner portions 11 (four upper corner portions and four lower corner portions), and vertically-extending four corner portions 12, are formed as large arcs. A bottom planar portion 13 and four side planar portions 14 of the tank main body 10 are each formed to be planar. In the present embodiment, a top planar portion 15 of the tank main body 10 is formed to have a dome-shaped structure, which is cambered and swelled. Supporting bodies 20 and 23, which support the tank main body 10 on a hull 30 (FIG. 5), are disposed at a plurality of positions on the outer surfaces of the tank main body 10. The supporting bodies 20 and 23 are components of the liquefied gas tank 1.

The number of supporting bodies 20 or 23 may be either singular or plural on each planar portion and set in accordance with, for example, the size and shape of the tank main body 10. In the present embodiment, a plurality of bottom supporting bodies 23 are disposed on the bottom planar portion 13 of the tank main body 10, and a plurality of side supporting bodies 20 are disposed on each of the four surrounding side planar portions 14, which face laterally. In the present embodiment, since the top planar portion 15 has a cambered dome-shaped structure, no supporting body is disposed on the top planar portion 15. Alternatively, the top planar portion 15 of the tank main body 10 may be formed to have a flat plane. In both a case where the top planar portion 15 is formed to have a flat plane and a case where the top planar portion 15 has a cambered dome-shaped structure, top supporting bodies may be disposed on the top planar portion 15. Each of the bottom, side, and top supporting bodies may alternatively be disposed on the hull 30. The shape of the tank main body 10 is not limited to the one described in the present embodiment.

Since the tank main body 10 according to the present embodiment is provided with the supporting bodies 20 and 23 in the above-described manner, a vertical load from the tank main body 10 is supported by the bottom supporting bodies 23 of the bottom planar portion 13, and a horizontal load that is exerted when a liquefied gas is stored in the tank main body 10 is supported by the side supporting bodies 20 of the side planar portions 14. In other words, the bottom supporting bodies 23 support the tank main body 10 from below the tank 10, and the side supporting bodies 20 support the tank main body 10 from the side of the tank main body 10. In a case where top supporting bodies are provided on the top planar portion 15, the top supporting bodies support a load that is exerted on the hull 30 from the tank main body 10 when the liquefied gas is stored in the tank main body 10. In other words, the top supporting bodies support the tank main body 10 from above the tank main body 10. The tank main body 10 is, when storing no cargo, supported by the bottom supporting bodies 23 disposed on the bottom planar portion 13, thereby standing by itself independently.

The tank main body 10 may be made of a nickel steel, which is a cryogenic steel (i.e., steel whose toughness does not significantly decrease even at low temperatures) and whose linear expansion coefficient is less than that of an aluminum alloy or austenitic stainless steel (e.g., 9 percent nickel steel, 7 percent nickel steel, or 5.5 percent nickel steel), or may be made of a high manganese steel. Since the tank main body 10, which repeatedly contracts and expands due to the storage of the liquefied gas, is made of the nickel steel, which is a cryogenic steel and whose linear expansion coefficient is relatively low, the amount of contraction and expansion of the tank main body 10 inside the hull 30 (see FIG. 8A to FIG. 8C) can be reduced compared to a case where the tank main body 10 is made of an aluminum alloy or austenitic stainless steel. In addition, since the aforementioned nickel steel has a higher yield stress than that of an aluminum alloy or austenitic stainless steel, which is often used as the material of a conventional liquefied gas tank, the thickness of each planar portion of the tank, the size and number of frame members on each planar portion of the tank, etc., can be reduced.

Figure 3:
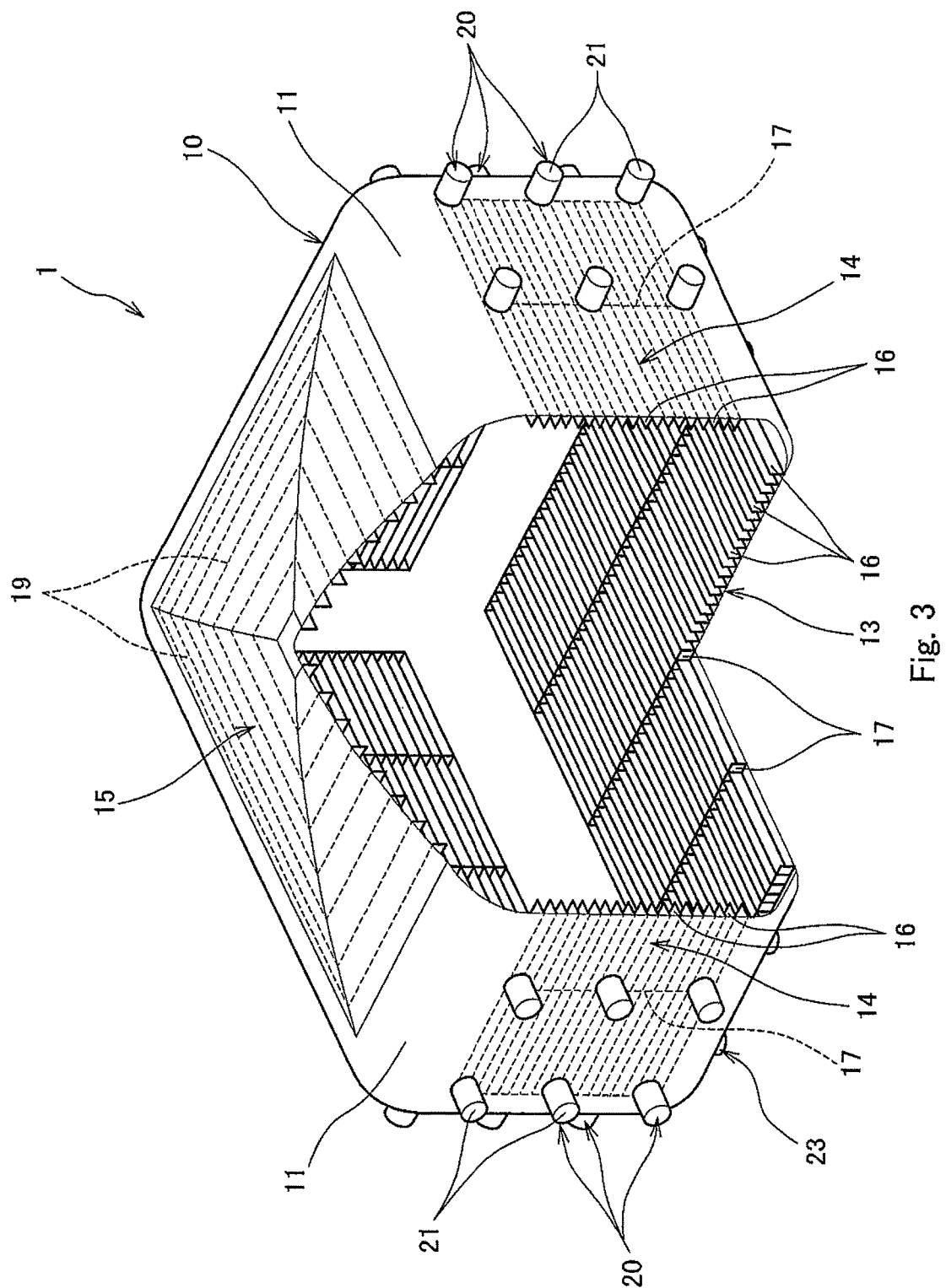
FIG. 3 is a perspective view of the tank main body of the liquefied gas tank of FIG. 1, showing a part of the tank body in cross section.

As shown in FIG. 3, frame members 16 and 17 are provided on the inner surface side of each of the bottom planar portion 13 and the side planar portions 14 of the tank main body 10, and thereby each of the bottom planar portion 13 and the side planar portions 14 has predetermined rigidity. In the present embodiment, the frame members 16 and 17 are provided in a lattice-like manner. To be more specific, on each side planar portion 14, the frame members 16 and 17 are provided in the longitudinal direction of the side planar portion 14 and a direction crossing the longitudinal direction. On the bottom planar portion 13, the frame members 16 and 17 are provided in directions along the four edges of the bottom planar portion 13. Since each of the bottom planar portion 13 and the side planar portions 14 is provided with the frame members 16 and 17 disposed in a lattice-like manner, each of the bottom planar portion 13 and the side planar portions 14 has predetermined rigidity that can bear the load that is exerted when the liquefied gas is stored in the tank main body 10.

The frame members 16 and 17 on the inner surfaces of the tank main body 10 are, as described below, densely and sparsely disposed in the horizontal and vertical directions so that the load can be passed on to (i.e., supported by) the hull 30 efficiently. In the present embodiment, on each side planar portion 14, the frame members 16 extending in the horizontal direction are provided densely, and the frame members 17 extending in the vertical direction are provided sparsely. This makes it possible to adjust the bending of the shape of each side planar portion 14 in an out-of-plane direction. Specifically, the amount of out-of-plane bending of the side planar portion 14 in the horizontal direction can be made relatively small by densely providing the frame members 16 extending in the horizontal direction, and the amount of out-of-plane bending of the side planar portion 14 in the vertical direction can be made relatively large by sparsely providing the frame members 17 extending in the vertical direction. The rigidity of each of the bottom planar portion 13 and the side planar portions 14 is set so that when thermal contraction or thermal expansion of the tank main body 10 occurs, the corner portions 11 and 12, which are described below, will bend (open or close) and deform in a suitable manner. It should be noted that the rigidity of each of the planar portions 13 and 14 may be increased by increasing their thickness.

Frame members 19 are provided on the inner surface side of the top planar portion 15, and thereby the top planar portion 15 has predetermined rigidity. In the present embodiment, the top planar portion 15 is formed to have a dome-shaped structure, which is cambered and swelled. Therefore, the top planar portion 15 is provided with the minimum necessary number of frame members 19 so that the top planar portion 15 can bear deformation of the tank main body 10. This makes it possible to reduce the number of frame members 19 of the upper structure of the tank main body 10, thereby simplifying the upper structure and reducing the weight of the upper structure. The frame members 19 of the top planar portion 15 are provided in a manner to form a plurality of concentric quadrangular rings. Alternatively, the top planar portion 15 may be provided with different frame members (e.g., the frame members 16 and 17 similarly to the bottom planar portion 13).

By disposing the frame members 16, 17, and 19 on the tank main body 10 in the above-described manner, the tank main body 10 has such a structure that the tank main body 10 stands by itself when installed in the hull 30.

On the other hand, the corner portions 11 and 12 are not provided with frame members. As a result, each of the corner portions 11 and 12 has a flexible structure whose rigidity is less than the rigidity of the planar portions 13, 14 and 15. Accordingly, when thermal contraction or thermal expansion of the tank main body 10 occurs, the corner portions 11 and 12 deform in a suitable manner. It should be noted that the corner portions 11 and 12 may be provided with frame members along their curves (i.e., frame members extending in the direction of their curves) as necessary.

Figure 4:
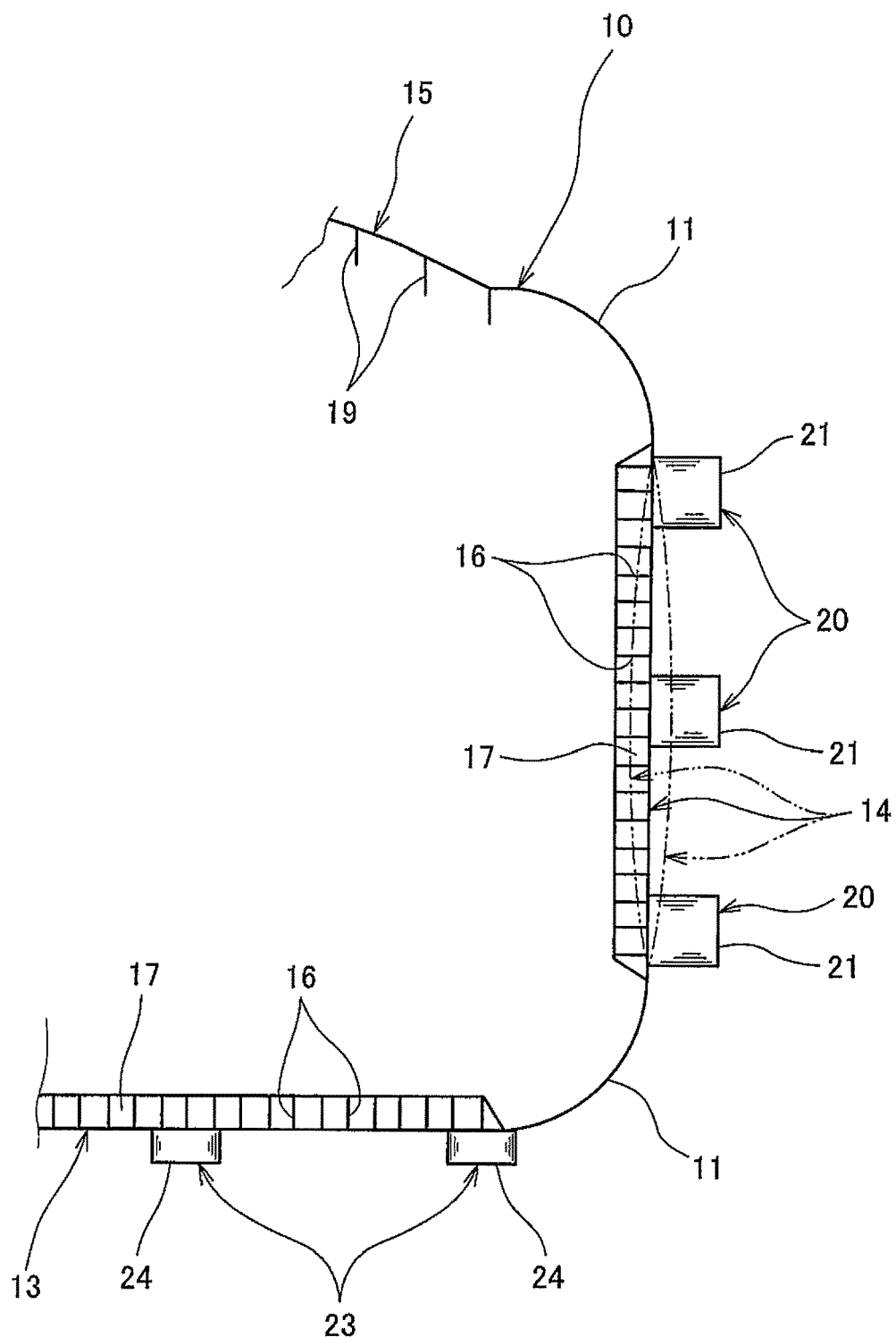
FIG. 4 is an enlarged sectional view showing a part of the tank main body of FIG. 3.

As shown in FIG. 4, the frame members 16 and 17, which are provided on the inner surface side of each of the bottom planar portion 13 and the side planar portions 14 of the tank main body 10, form an integral lattice-like shape, which is formed when the frame members 16 and 17, which extend perpendicularly to each other, are joined together by welding or the like. Owing to these frame members 16 and 17, the bottom planar portion 13 and the side planar portions 14 have suitable rigidity. On the other hand, the frame members 19 provided on the inner surface side of the top planar portion 15 of the tank main body 10 form integral quadrangular rings, which are formed when the frame members 19, which extend perpendicular to each other, are joined together by welding or the like. Owing to these frame members 19, the top planar portion 15 has rigidity.

The cross section of each of the corner portions 11 and 12 is a large arc. When thermal contraction of the tank main body 10 occurs or when the tank main body 10 expands due to the storage of the liquefied gas therein, the corner portions 11 and 12 bend and deform, thereby absorbing the thermal contraction or expansion. By forming the arc of each of the corner portions 11 and 12 such that the arc has a radius of, for example, ½ to ¹⁄₁₀ of the height of the tank main body 10, the thermal contraction that occurs to the tank main body 10 can be suitably absorbed. In addition, by forming the arc in this manner, in a case where the tank main body 10 is partly loaded with a cargo liquid (i.e., a case where the tank main body 10 is not fully loaded with the cargo liquid), even if the tank main body 10 oscillates and thereby the cargo liquid therein shakes, the cargo liquid is allowed to move to the upper part of the tank along the large arcs of the corner portions 11 and 12. This makes it possible to alleviate impact force due to sloshing in this type of tank. As indicated by two-dot chain lines, each side planar portion 14 may be formed such that its central part is curved inward or outward. That is, the central part of the side planar portion 14 may be recessed or protrude from its peripheral part. In this case, even if the cargo liquid shakes inside the tank main body 10, the cargo liquid is allowed to move along the curved side planar portion 14. Accordingly, the impact force due to sloshing can be further alleviated.

As shown in FIG. 3, the supporting bodies 20 and 23 provided on the outer surfaces of the tank main body 10 are disposed at positions corresponding to the frame members 16 and 17. In the present embodiment, the supporting bodies 20 and 23 are provided on the outer surfaces at positions that correspond to the positions where the frame members 16 and 17 intersect. Accordingly, the load exerted on the hull 30 is supported by the supporting bodies 20 and 23 of the tank main body 10 at highly rigid positions, of the bottom planar portion 13 and the side planar portions 14 of the tank main body 10, where the frame members 16 and 17 intersect. By supporting the load at the highly rigid positions, it is intended to reduce the number of supporting bodies 20 and 23. The supporting bodies 20 and 23 may be disposed in such a manner that the number of supporting bodies 20 and 23 is minimum necessary in accordance with the load that is exerted on the hull 30 from the tank main body 10.

For example, fiber reinforced plastic (FRP), such as carbon fiber reinforced plastic (CFRP) or glass fiber reinforced plastic (GFRP), and fabric phenolic resin (formed by stacking resin sheets), which are materials with high thermal insulation capacity and high strength, are used for the side supporting bodies 20 (and the bottom supporting bodies 23).

Figure 5:
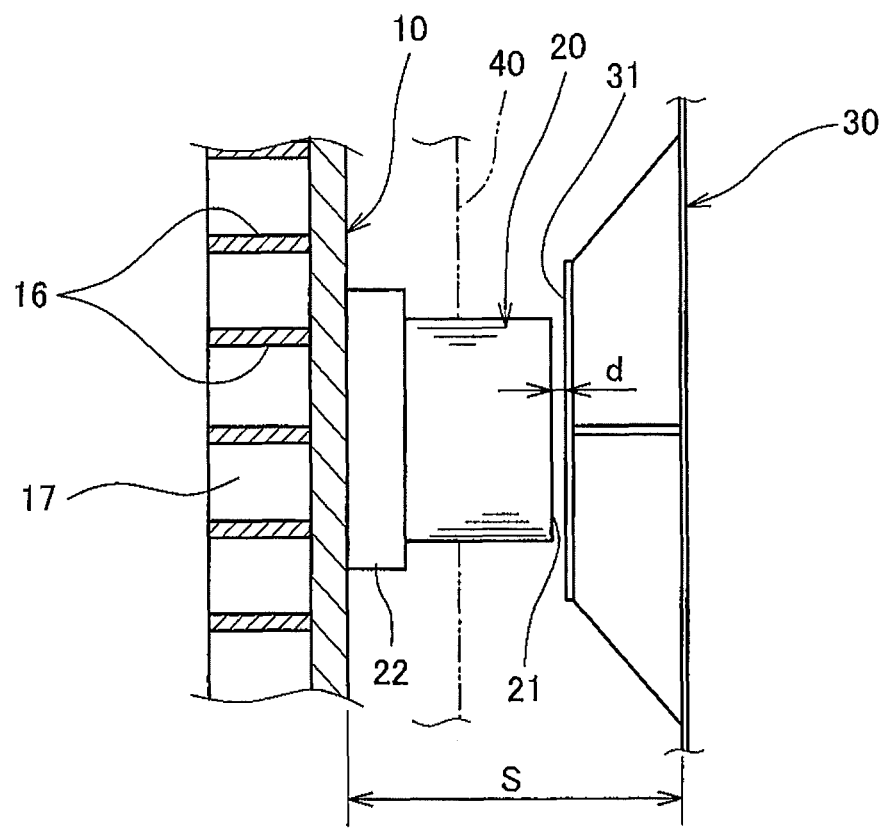
FIG. 5 is an enlarged view showing a relationship between a side supporting body of FIG. 4 and a hull.

FIG. 5 shows an example where side supporting bodies 20 formed as cylindrical bodies made of glass fiber reinforced plastic with low thermal conductivity are used as supporting components that support the tank main body 10 on the hull 30. The side supporting bodies 20 are fixed to cylindrical fixing frames 22 provided on the outer surfaces of the tank main body 10. (For example, the supporting bodies 20 (23) are fitted in the fixing frames 22.) It should be noted that either the side supporting bodies 20 or the bottom supporting bodies 23 may be formed as cylindrical bodies made of fiber reinforced plastic. If the side supporting bodies 20 are made of fiber reinforced plastic, the side supporting bodies 20 can be formed in any shape. (The same is true of the bottom supporting bodies 23.) FIG. 5 shows a state before the side supporting body 20 is supported by a receiving seat 31 provided on the hull 30 at the time of installing the empty tank main body 10 in the hull 30.

The area of a contact surface 21 where the side supporting body 20 contacts the receiving seat 31 is set in accordance with a load to be supported by the receiving seat 31. (The same is true of a contact surface 24 where the bottom supporting body 23 contacts the receiving seat 31.) The receiving seat 31 is formed to have an area greater than the area of the contact surface 21 (24) of the supporting body 20 (23) so that even if the tank main body 10 contracts due to thermal contraction and the position of the supporting body 20 (23) shifts, the receiving seat 31 can support the supporting body 20 (23). The receiving seat 31 described herein is merely one example. The receiving seat 31 may be configured in any manner, so long as the receiving seat 31 can support the load that is exerted from the supporting body 20 (23). As shown in FIG. 5, in a state where the tank main body 10 is installed in the hull 30, a gap d is formed between the side supporting body 20 and the receiving seat 31.

By providing the receiving seat 31 on the hull 30, space S is obtained between the tank main body 10 and the hull 30. There is a case where a thermal insulator 40 is fixed to the outer surfaces of the tank main body 10. In this case, the space S may be the space that a worker enters for, for example, maintenance and inspection of the thermal insulator 40 on the outer surfaces of the tank main body 10. The manner of fixing the thermal insulator 40 to the tank main body 10 is not particularly limited, so long as the thermal insulator 40 can be stably fixed. For example, the thermal insulator 40 may be fixed to the tank main body 10 by stud bolts or by adhesion.

Figure 6:
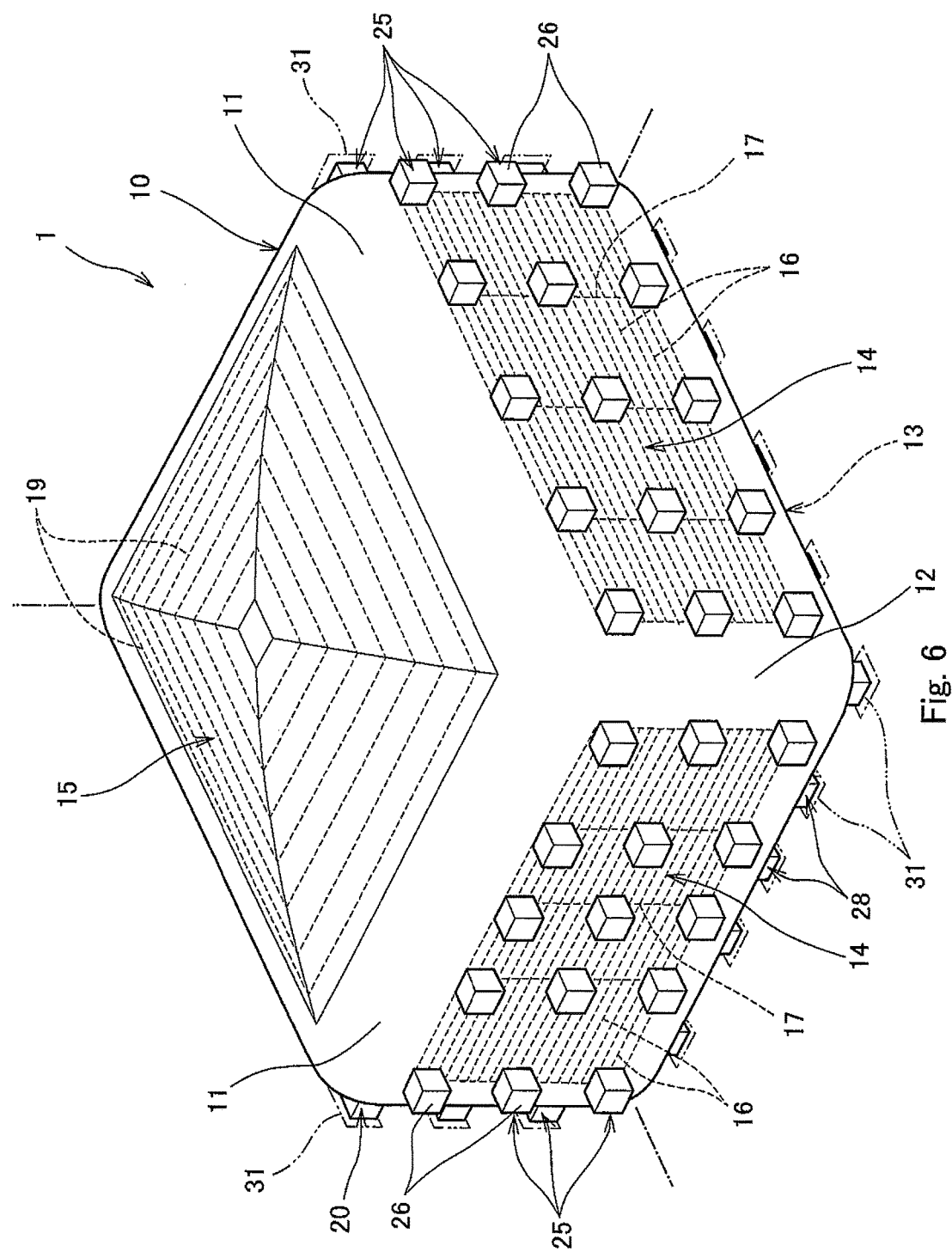
FIG. 6 is a perspective view of a liquefied gas tank seen from above, the liquefied gas tank including, as a different example, supporting bodies different from those shown in FIG. 4.
Figure 7:
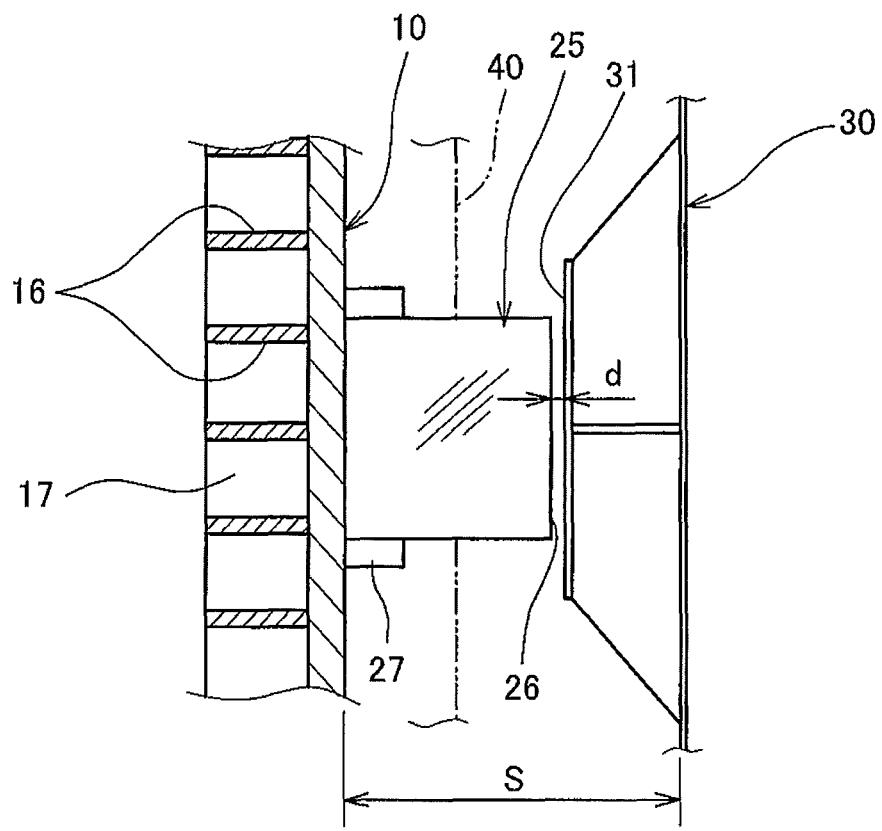
FIG. 7 is an enlarged view showing a relationship between a supporting body of FIG. 6 and a hull.

As shown in FIGS. 6 and 7, the supporting components that support the tank main body 10 on the hull 30 may be supporting bodies 25 and 28 made of fabric phenolic resin. In the case of the supporting bodies 25 and 28 made of fabric phenolic resin, the cross section of each supporting body has a quadrangular shape, and a contact surface 26 where the supporting body 25 contacts the receiving seat 31 has a quadrangular shape. (The same is true of a contact surface where the bottom supporting body 28 contacts the receiving seat 31.) In FIGS. 6 and 7, the same components as those shown in FIGS. 1 and 5 are denoted by the same reference signs as those used in FIGS. 1 and 5, and the description of such components is omitted below.

As shown in FIG. 7, in this case, quadrangular-ring-shaped protruding members 27 are provided on the outer surfaces of the tank main body 10. The supporting body 25 (28) having a quadrangular shape is fixed to each protruding member 27. (For example, the supporting body 25 (28) is fitted in the protruding member 27.) Also in the case of the side supporting body 25, in a state where the tank main body 10 is installed in the hull 30, a gap d is formed between the side supporting body 25 and the receiving seat 31. Also in the case of the supporting bodies 25 and 28 made of fabric phenolic resin, the cross-sectional shape thereof is not limited to a quadrangular shape, but may be a round shape, for example.

Figure 8A:
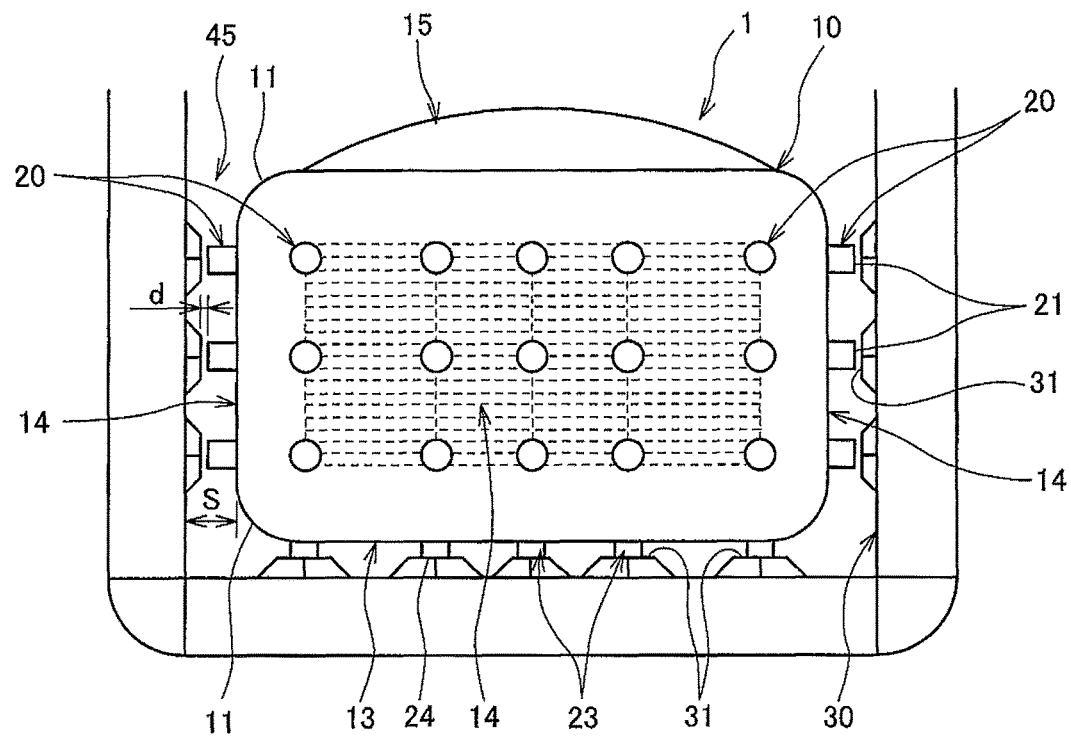
FIG. 8A is a side view showing a state where the liquefied gas tank of FIG. 1 is installed in the hull.
Figure 8B:
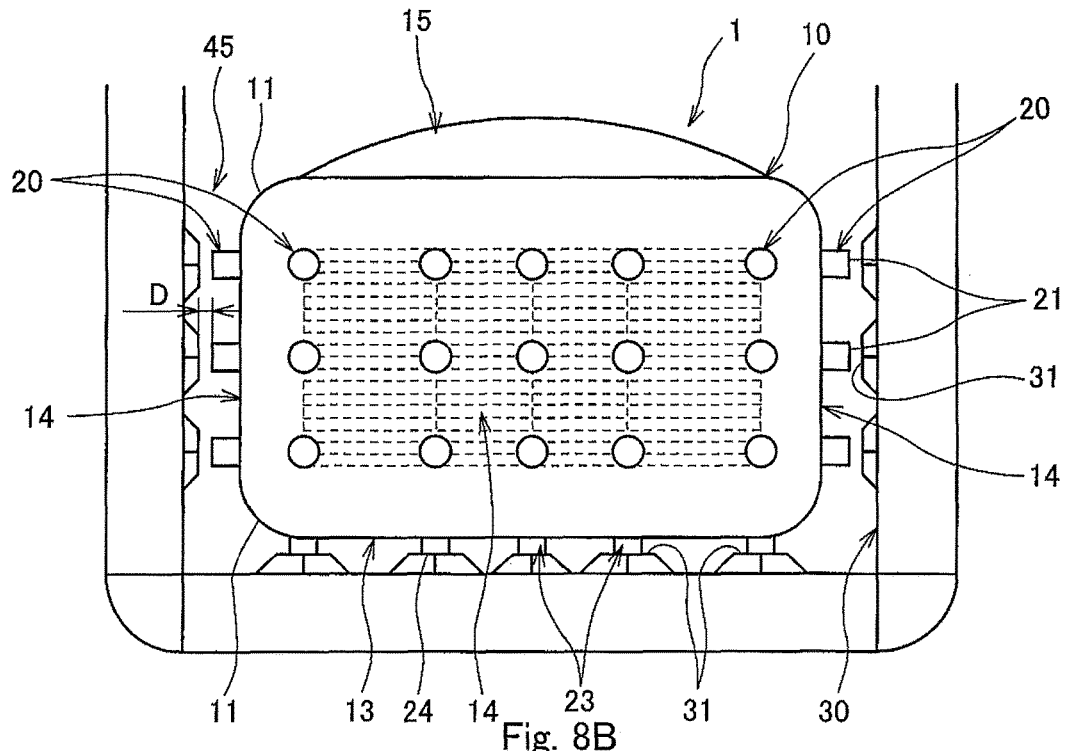
FIG. 8B is a side view showing a state where the liquefied gas tank of FIG. 8A is pre-cooled.
Figure 8C:
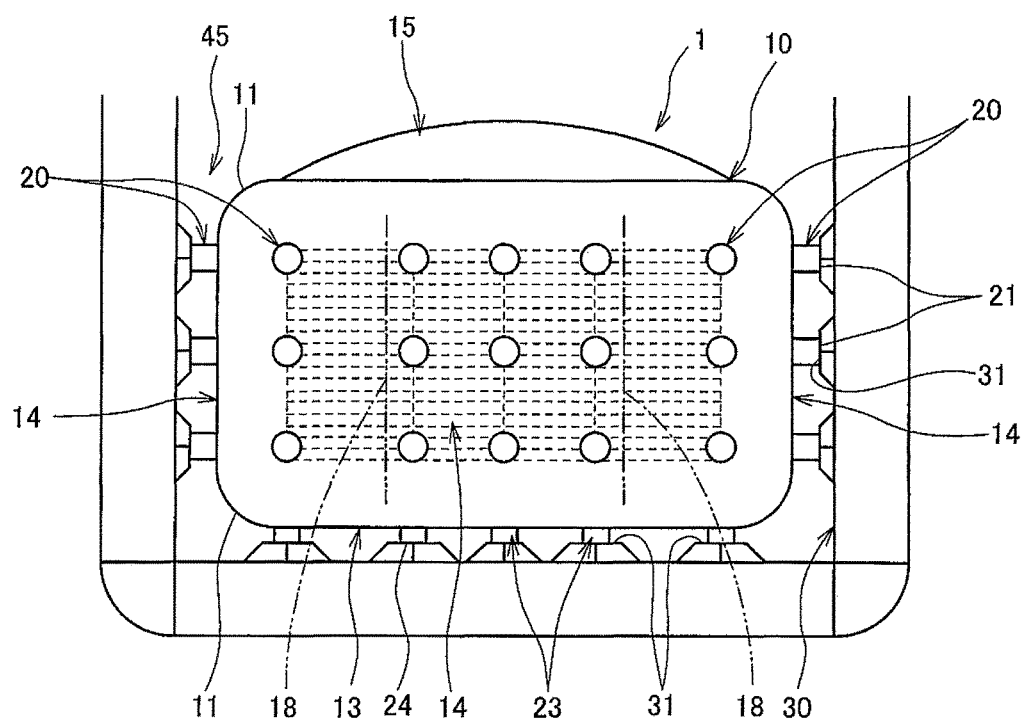
FIG. 8C is a side view showing a state where a liquefied gas is stored in the liquefied gas tank of FIG. 8B.

Next, with reference to FIG. 8A to FIG. 8C, the liquefied gas tank 1 when it is installed in the hull, and changes that occur to the liquefied gas tank 1 when the liquefied gas tank 1 is pre-cooled after its installation and when the liquefied gas is stored in the liquefied gas tank 1, are described. In the description below, the walls of the hull 30 are taken as an example, and a state where the front wall is removed is shown in the drawings and described. In the drawings, the gap d (D) between the receiving seats 31 provided on the hull 30 and the contact surfaces 21 of the side supporting bodies 20 is shown in an exaggerated manner.

As shown in FIG. 8A, space 45 in which the tank main body 10 can be installed at a normal temperature is formed in the hull 30. In a state where the tank main body 10 is installed in the hull 30, a predetermined gap d (e.g., about several millimeters) is formed between the contact surface 21 of each side supporting body 20 and its corresponding receiving seat 31. As described below, the gap d is set so that when the tank main body 10 stores the liquefied gas and expands, the load exerted on the receiving seats 31 from the side supporting bodies 20 of the side planar portions 14 will be suitable.

Accordingly, at the time of installing the tank main body 10 in the hull 30 at a normal temperature, since there is the gap d between the tank main body 10 and the hull 30, the tank main body 10, which is independently manufactured separately from the hull 30, can be readily installed in the hull 30. The tank main body 10 installed in the hull 30 is in the state of standing by itself independently in such a manner that the bottom supporting bodies 23 provided on the bottom planar portion 13 are supported by the receiving seats 31.

Next, as shown in FIG. 8B, when the inside of the tank main body 10 is pre-cooled, thermal contraction of the tank main body 10 occurs. At the time, the tank main body 10 is supported on the receiving seats 31 at the bottom by the bottom supporting bodies 23 provided on the bottom planar portion 13, and thermal contraction of the surrounding side planar portions 14 occurs separately from the hull 30. A greater gap D is formed between each of the side supporting bodies 20 of the side planar portions 14 and its corresponding receiving seat 31 (e.g., several tens of mm). The size of the gap D is determined based on, for example, the linear expansion coefficient of the tank main body 10. As described above, the rigidity and the like of the tank main body 10 are set in accordance with the load that is to be exerted on the receiving seats 31 from the side supporting bodies 20 of the side planar portions 14 when the tank main body 10 stores the liquefied gas and expands.

Next, as shown in FIG. 8C, when a cargo liquid of a predetermined amount or more is stored inside the pre-cooled tank main body 10, the load (i.e., the weight of the cargo liquid) is exerted on the bottom planar portion 13 and the side planar portions 14 of the tank main body 10. Due to the load, the corner portions 11 and 12 having low rigidity deform, and thereby the tank main body 10 expands outwardly (when such outward expansion occurs, the height of the tank main body 10 tends to decrease; however, since the liquefied gas vaporizes in the tank main body 10, the pressure in the tank main body 10 increases, which causes upward expansion of the tank main body 10), and the contact surfaces 21 of the side supporting bodies 20 disposed on the side planar portions 14 come into surface contact with the receiving seats 31 provided on the hull 30. As a result, the gap D is eliminated. The load that is exerted at the time on the receiving seats 31 of the hull 30 from the side supporting bodies 20 disposed on the side planar portions 14 of the tank main body 10 is adjusted to be a suitable load by adjusting, for example, the arrangement and the number of frame members 16 and 17 of the tank main body 10. Thus, the cargo liquid load exerted on the tank main body 10 can be supported by: the support by the bottom supporting bodies 23 when the tank main body 10 stands by itself; and the support by the hull 30 via the side supporting bodies 20 (i.e., the tank main body 10 is supported in a manner to lean against the hull 30 via the side supporting bodies 20).

It should be noted that in a case where top supporting bodies are fixed to the tank main body 10, the tank main body 10 can be supported by the hull 30 via the top supporting bodies (i.e., supported in a manner to lean against the hull 30 via the top supporting bodies) if the tank main body 10 expands upward due to internal pressure and internal liquid pressure, the internal pressure being generated in the upper part of the tank main body 10 when the liquefied gas stored in the tank main body 10 vaporizes and expands, the internal liquid pressure being exerted in the upper part of the tank main body 10 in accordance with tilting of the hull 30 or in accordance with front, rear, right, or left movement of the hull 30. That is, by fixing the top supporting bodies to the tank main body 10, upper expansion of the tank main body 10 can be suppressed.

Of the cargo liquid load exerted on the tank main body 10, the proportion of the load supported by the bottom supporting bodies 23 when the tank main body 10 stands by itself and the proportion of the load supported by the hull 30 via the side supporting bodies 20 are suitably set, for example, by the rigidity of the planar portions 13, 14, and 15 of the tank main body 10 and the rigidity of the flexible structures of the corner portions 11 and 12.

Even if the liquefied gas shakes inside the tank main body 10 due to, for example, oscillation of the hull 30, the liquefied gas is allowed to move upward along the large arcs of the corner portions 11 and 12 of the tank main body 10. Accordingly, the sloshing load that occurs when the tank main body 10 is in the state of being supported by the hull 30 via the side supporting bodies 20 of the side planar portions 14 is reduced, and the sloshing load can be suitably supported by the hull 30 at the receiving seats 31 via the side supporting bodies 20 of the tank main body 10.

It should be noted that oscillation prevention bulkheads 18 may be disposed inside the tank main body 10 in accordance with the size and the like of the tank main body 10 as a preventative measure against the sloshing. In a case where the bulkheads 18 are disposed, the direction in which the bulkheads 18 are disposed (the direction may be either the longitudinal direction or the width direction of the hull shown in the drawing), the positions of the bulkheads 18, the number of bulkheads 18, etc., may be suitably set as necessary.

Further, according to this liquefied gas tank 1, there is a case where when part of the liquefied gas therein is discharged from the state shown in FIG. 8C, the tank main body 10 contracts and the side supporting bodies 20 of the side planar portions 14 become spaced apart from the receiving seats 31. However, also in this case, the tank main body 10 is supported at the receiving seats 31 by the bottom supporting bodies 23 of the bottom planar portion 13, and thereby the tank main body 10 is kept standing by itself. Thereafter, even if storing and discharging of the liquefied gas are repeated, the corner portions 11 and 12 of the tank main body 10 deform and thereby the contact surfaces 21 of the side supporting bodies 20 of the side planar portions 14 come into contact with or become spaced apart from the receiving seats 31. In this manner, deformation is suitably made in accordance with contraction and expansion of the tank main body 10, and thereby a stable state can be maintained.

Figure 9:
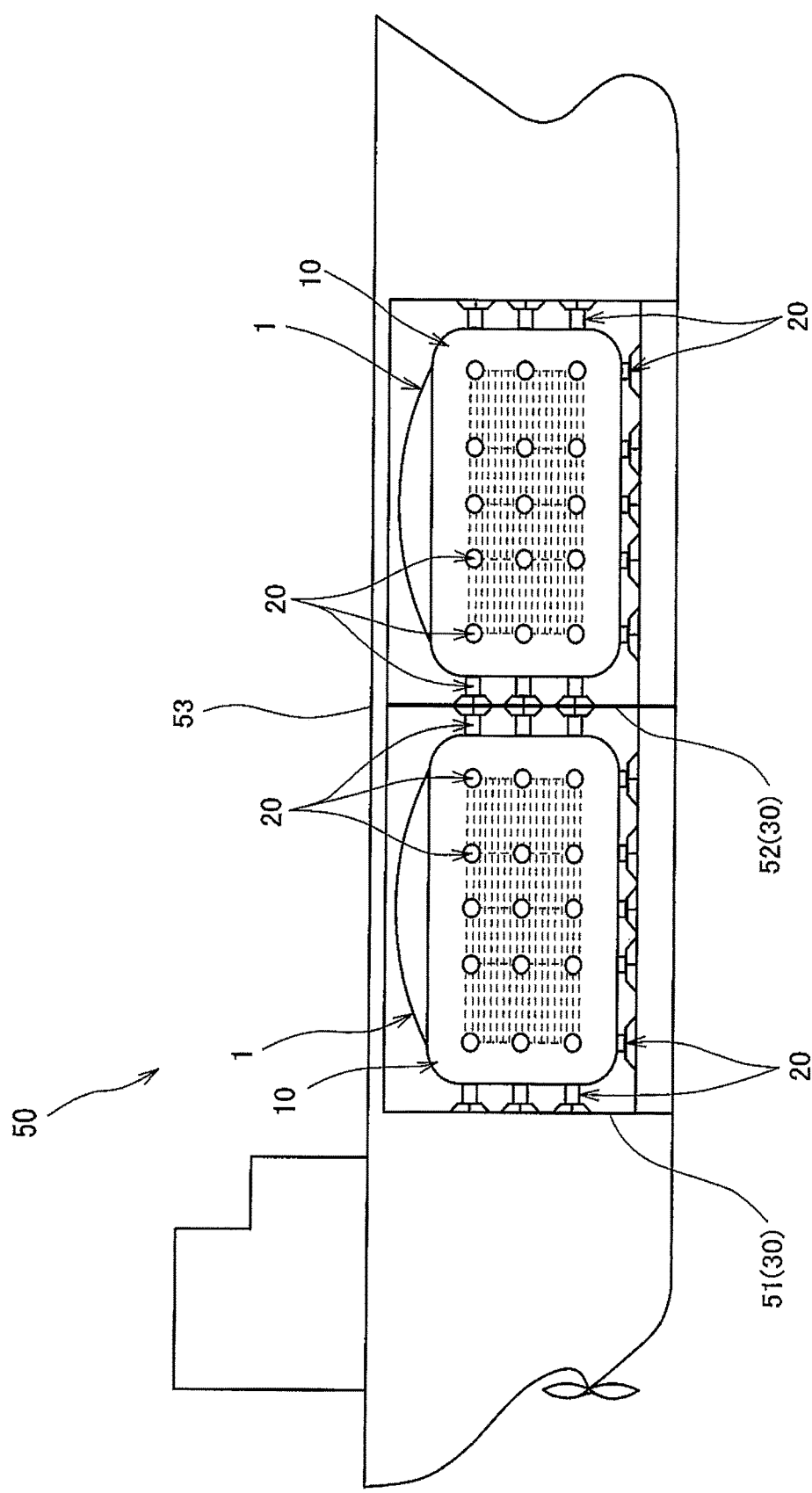
FIG. 9 is a side view of a ship in which a plurality of liquefied gas tanks as shown in FIG. 1 are installed in the longitudinal direction of the ship hull.

As shown in FIG. 9, a ship 50 intended to include the above-described liquefied gas tank 1 may be configured to include a plurality of liquefied gas tanks 1, which are arranged in the longitudinal direction of a hull 51, and a bulkhead 52 may be used to divide the liquefied gas tanks 1. According to the ship 50 including the plurality of liquefied gas tanks 1 in this manner, the size of each tank main body 10 can be optimized in accordance with the hull 51; sloshing can prevented; the capacity of each liquefied gas tank 1 can be made high; and the storage and transportation of the liquefied gas can be performed efficiently.

In addition, since a deck 53 of the ship 50 can be made flat, in a case where the ship 50 serves as a LNG terminal or the like that is retained at a fixed point on the ocean, a LNG liquefier, a power generating unit, a transfer apparatus, etc., can be disposed on the deck 53.

The tank main body 10, which is manufactured separately from the hull 51, can be readily installed, and part of the load that is exerted when the tank main body 10 stores the liquefied gas and expands can be supported by the hull 51 (and the bulkhead 52) via the side supporting bodies 20. This makes it possible to reduce the manufacturing cost of the liquefied gas tank 1, and realize the ship 50 capable of utilizing the high-capacity liquefied gas tanks 1 in a stable manner.

As described above, according to the liquefied gas tank 1, the tank main body 10 can stand by itself independently of the installation-side surrounding structural body (hull) 30, and the tank main body 10 can be independently manufactured separately from the installation-side surrounding structural body 30. This makes it possible to reduce the manufacturing time and improve the manufacturing efficiency, and thereby the manufacturing cost can be reduced.

Moreover, since the load exerted on the tank main body 10 is supported by the surrounding structural body 30 via the side supporting bodies 20, the load to be supported only by the tank main body 10 can be reduced, and the structure of the tank main body 10 can be simplified (the number of components can be reduced). Therefore, the cost relating to the manufacturing of the tank can be reduced.

Furthermore, the tank main body 10 with the supporting bodies 20 and 23 fixed thereto can be readily installed, as an independent structure, in the surrounding structural body 30. In addition, in a state where the tank main body 10 is installed in the surrounding structural body 30, inspection space for inspecting the thermal insulator fixed to the outer surfaces of the tank main body 10 can be obtained between the tank main body 10 and the surrounding structural body 30.

The tank main body 10 installed in the surrounding structural body 30 can stand by itself independently when the tank main body 10 stores no cargo. When the tank main body 10 is pre-cooled, the tank main body 10 thermally contracts separately from the installation-side surrounding structural body 30, and when the liquefied gas is stored in the tank main body 10, the contact surfaces 21 of the side supporting bodies 20 come into surface contact with the receiving seats 31 of the installation-side surrounding structural body 30, thereby keeping the load-supporting state. Thus, whatever state the liquefied gas tank 1 is in, the tank main body 10 can deform into a suitable state, and thereby the liquefied gas tank 1 can keep its suitable state even if, for example, storing and discharging of the liquefied gas are repeated.

It should be noted that the tank main body 10 in the above-described embodiment is merely one example. The size and shape of the tank main body 10, the number of supporting bodies 20 and 23, etc., may be set in accordance with, for example, the type and usage conditions of the liquefied gas, and are not limited to the above-described embodiment.

The tank main body 10, which has a quadrangular shape in plan view in the above-described embodiment, may have such a shape that the side planar portions 14 are, as described above, slightly swelled when seen in side view. Thus, the definition of the quadrangular shape of the tank main body 10 herein includes any shape close to a quadrangle.

The above description of the embodiment gives non-limiting examples, and various modifications can be made to the embodiment without departing from the spirit of the present invention. Thus, the present invention is not limited to the above-described embodiment.

INDUSTRIAL APPLICABILITY

The liquefied gas tank according to the present invention can be utilized for, for example, a LNG terminal retained at a fixed point on the ocean or a LNG carrier.

REFERENCE SIGNS LIST 1 liquefied gas tank
10 tank main body
11 corner portion
12 corner portion
13 bottom planar portion (planar portion)
14 side planar portion (planar portion)
15 top planar portion (planar portion)
16 frame member
17 frame member
18 bulkhead
20 side supporting body (fiber reinforced plastic)
21 contact surface
23 bottom supporting body (fiber reinforced plastic)
25 side supporting body (fabric phenolic resin)
26 contact surface
28 bottom supporting body (fabric phenolic resin)
30 surrounding structural body (hull)
31 receiving seat
40 thermal insulator
45 space
50 ship
51 bulkhead
52 hull
53 deck
S space
d, D gap

The invention claimed is:
1. A liquefied gas tank installed in a surrounding structural body, comprising:
   a tank main body in which a liquefied gas is storable, the tank main body including a plurality of face portions and corner portions between the face portions, the corner portions having less rigidity than that of the face portions;
   a bottom supporting body that supports the tank main body from below the tank main body, the bottom supporting body being provided on one of the surrounding structural body and the tank main body; and
   a plurality of side supporting bodies that support the tank main body from each lateral side of the tank main body, the side supporting bodies being provided on one of the surrounding structural body and the tank main body, wherein
   the tank main body is configured to:
   (a) have self-supporting sides such that the bottom supporting body contacts both of the surrounding structural body and the tank main body while the plurality of side supporting bodies do not contact the other one of the surrounding structural body and the tank main body when the tank main body stores no cargo, and (b) be supported by the bottom supporting body and the plurality of side supporting bodies such that the bottom supporting body contacts both of the surrounding structural body and the tank main body while the plurality of side supporting bodies contact the other one of the surrounding structural body and the tank main body when the liquefied gas is stored in the tank main body.

2. The liquefied gas tank according to claim 1, wherein the plurality of side supporting bodies are provided on side face portions that face laterally among the face portions, when the tank main body stores no cargo, a gap is formed between each of the plurality of side supporting bodies and the surrounding structural body, and when the liquefied gas is stored in the tank main body, the tank main body expands at least laterally, such that the plurality of side supporting bodies come into contact with the surrounding structural body and support a load.

3. The liquefied gas tank according to claim 2, wherein when the tank main body is pre-cooled, the gap between each of the plurality of side supporting bodies and the surrounding structural body increases compared to when the tank main body stores no cargo.

4. The liquefied gas tank according to claim 1, wherein the bottom supporting body is one of a plurality of bottom supporting bodies.

5. The liquefied gas tank according to claim 1, wherein the tank main body further includes frame members provided on the face portions.

6. The liquefied gas tank according to claim 5, wherein the frame members are disposed on an inner surface side of the face portions, and the plurality of side supporting bodies and the bottom supporting body are disposed, on an outer surface side of the face portions, at positions corresponding to the frame members.

7. The liquefied gas tank according to claim 1, wherein each of the plurality of side supporting bodies and/or the bottom supporting body is a cylindrical body made of fiber reinforced plastic.

8. The liquefied gas tank according to claim 1, wherein the tank main body is formed to have a dome-shaped structure such that, among the face portions, a top face portion facing upward is cambered and swelled.

9. The liquefied gas tank according to claim 1, wherein each of the corner portions has an arc-shaped cross section whose radius is in a range of ½ to ⅒ of a height of the tank main body.

10. The liquefied gas tank according to claim 1, wherein the tank main body is formed such that a central part of each of side portions facing laterally among the face portions is curved inward or outward.

11. The liquefied gas tank according to claim 1, wherein the tank main body is made of a nickel steel.

12. An on-water structure comprising the liquefied gas tank according to claim 1.

13. The on-water structure according to claim 12, comprising a plurality of the liquefied gas tanks, wherein a bulkhead divides the plurality of the liquefied gas tanks.

14. A liquefied gas tank installed in a surrounding structural body, comprising:

a tank main body in which a liquefied gas is storable, the tank main body including a plurality of face portions and corner portions between the face portions, the corner portions having less rigidity than that of the face portions;

a bottom supporting body that supports the tank main body from below the tank main body, the bottom supporting body being provided on one of the surrounding structural body and the tank main body; and a plurality of side supporting bodies that support the tank main body from each lateral side of the tank main body, the side supporting bodies being provided on one of the surrounding structural body and the tank main body, wherein the tank main body is configured to:

(a) have self-supporting sides such that the bottom supporting body contacts both of the surrounding structural body and the tank main body while the plurality of side supporting bodies do not contact the other one of the surrounding structural body and the tank main body in a case where the tank main body stores no cargo, and (b) be supported by the bottom supporting body and the plurality of side supporting bodies when the tank main body expands at least laterally such that the bottom supporting body contacts both of the surrounding structural body and the tank main body while the plurality of side supporting bodies contact the other one of the surrounding structural body and the tank main body in a case where the liquefied gas is stored in the tank main body.

15. A liquefied gas tank installed in a surrounding structural body, comprising:

a tank main body in which a liquefied gas is storable, the tank main body including a plurality of face portions and corner portions between the face portions, the corner portions having less rigidity than that of the face portions;

a bottom supporting body that supports the tank main body from below the tank main body, the bottom supporting body being provided on one of the surrounding structural body and the tank main body; and a plurality of side supporting bodies that support the tank main body from side of the tank main body, the side supporting bodies being provided on one of the surrounding structural body and the tank main body, wherein the tank main body is configured to:

(a) have self-supporting sides such that the bottom supporting body contacts both of the surrounding structural body and the tank main body and a gap is formed between each of the plurality of side supporting bodies and the other one of the surrounding structural body and the tank main body in a case where the tank main body stores no cargo, and (b) be supported by the bottom supporting body and the plurality of side supporting bodies when a load of the liquefied gas causes deformation of the corner portions such that the tank main body expands at least laterally such that the bottom supporting body contacts both of the surrounding structural body and the tank main body while the plurality of side supporting bodies contact the other one of the surrounding structural body and the tank main body in a case where the liquefied gas is stored in the tank main body.

* * * * *